United States Patent
Bournelle et al.

(10) Patent No.: US 8,948,736 B2
(45) Date of Patent: Feb. 3, 2015

(54) METHOD OF MANAGING AT LEAST ONE WIRELESS COMMUNICATIONS INTERFACE OF A TERMINAL, AND A TERMINAL

(75) Inventors: Julien Bournelle, Paris (FR); Lionel Morand, Malakoff (FR)

(73) Assignee: Orange, Paris (FR)

( * ) Notice: Subject to any disclaimer, the term of this patent is extended or adjusted under 35 U.S.C. 154(b) by 0 days.

(21) Appl. No.: 13/520,788

(22) PCT Filed: Dec. 29, 2010

(86) PCT No.: PCT/FR2010/052935
§ 371 (c)(1),
(2), (4) Date: Jul. 5, 2012

(87) PCT Pub. No.: WO2011/080491
PCT Pub. Date: Jul. 7, 2011

(65) Prior Publication Data
US 2012/0282910 A1    Nov. 8, 2012

(30) Foreign Application Priority Data
Apr. 1, 2010  (FR) ..................................... 10 50013

(51) Int. Cl.
*H04W 4/02* (2009.01)
*H04W 48/18* (2009.01)
*H04W 48/20* (2009.01)
*H04W 64/00* (2009.01)
*H04W 48/02* (2009.01)

(52) U.S. Cl.
CPC .............. *H04W 48/18* (2013.01); *H04W 64/00* (2013.01); *H04W 48/02* (2013.01); *H04W 48/20* (2013.01)

USPC ...................... 455/418; 455/456.1; 455/456.3; 455/456.6

(58) Field of Classification Search
CPC ..... H04W 48/18; H04W 48/20; H04W 48/02; H04W 64/00; H04W 4/02
USPC .......................... 455/418, 456.1, 456.3, 456.6
See application file for complete search history.

(56) References Cited

U.S. PATENT DOCUMENTS

| | | | |
|---|---|---|---|
| 5,590,174 A * | 12/1996 | Tsuji et al. ..................... 455/417 |
| 6,363,255 B1 * | 3/2002 | Kuwahara .................. 455/456.5 |
| 7,310,515 B2 * | 12/2007 | Enderlein et al. .......... 455/414.1 |
| 2002/0111173 A1 * | 8/2002 | Hendrey et al. ............... 455/456 |
| 2006/0193295 A1 | 8/2006 | White et al. |
| 2007/0249365 A1 * | 10/2007 | Jendbro ..................... 455/456.1 |
| 2008/0102787 A1 * | 5/2008 | Landschaft et al. ......... 455/404.2 |
| 2012/0309389 A1 * | 12/2012 | Olson ......................... 455/426.1 |

FOREIGN PATENT DOCUMENTS

| | | |
|---|---|---|
| CN | 1666539 | 9/2005 |
| WO | WO 01/97543 | 12/2001 |
| WO | WO 2004/004372 | 1/2004 |

* cited by examiner

*Primary Examiner* — Khai M Nguyen
(74) *Attorney, Agent, or Firm* — Cozon O'Connor

(57) ABSTRACT

The management method of the invention comprises: an obtaining step (E10) of obtaining information (CId) representative of the geographical location of the terminal; a searching step (E20) of searching in a database of the terminal for at least one identifier of a wireless communications interface of the terminal that is associated with said information; and if such an associated identifier is found, an automatic activation step (E50) of activating the wireless communications interface corresponding to said at least one identifier.

9 Claims, 2 Drawing Sheets

US 8,948,736 B2

METHOD OF MANAGING AT LEAST ONE WIRELESS COMMUNICATIONS INTERFACE OF A TERMINAL, AND A TERMINAL

RELATED APPLICATIONS

This is a U.S. National Phase Application under 35 USC 371 of International Application PCT/FR2010/052935 filed on Dec. 29, 2010.

This application claims the priority of French application Ser. No. 10/50013 filed Jan. 4, 2010, the entire content of which is hereby incorporated by reference.

BACKGROUND OF THE INVENTION

The present invention relates to the general field of telecommunications.

More particularly, it relates to activating a wireless communications interface on a terminal, such as, for example, an interface of the Bluetooth™, or WiFi™ (Wireless Fidelity) type.

The term "activation" (or correspondingly "deactivation") is used herein with respect to a wireless communications interface to mean switching on or starting the interface (or correspondingly switching it off). In other words, in the meaning of the invention, a wireless communications interface does not transmit any signal (not even a presence signal), so long as it is not activated.

In general manner, wireless communications interfaces of the Bluetooth™ or wireless local area network (WLAN) type enable a terminal to connect to a home network or to a private or public communications network via an access point. This connection is possible only when the communications interface is activated.

At present, a wireless communications interface is activated and deactivated manually by the user of the terminal: the user makes use of a dedicated menu of the terminal to select an interface for activating or deactivating, and then specifies which action is to be performed (i.e. activation or deactivation).

In order to avoid repeatedly activating and deactivating communications interfaces, the user has the option of leaving the wireless communications interfaces of the terminal activated permanently.

Nevertheless, that option consumes a considerable amount of energy and therefore has a non-negligible impact on the battery life of the terminal.

OBJECT AND SUMMARY OF THE INVENTION

The present invention serves in particular to mitigate that drawback by proposing a management method for managing at least one wireless communications interface of a terminal, the method comprising:
- an obtaining step of obtaining information representative of the geographical location of the terminal;
- a searching step of searching in a database of the terminal for at least one identifier of a wireless communications interface of the terminal that is associated with said information; and
- if such an associated identifier is found, an automatic activation step of activating the wireless communications interface corresponding to said at least one identifier.

Correspondingly, the invention also provides a terminal fitted with at least one wireless communications interface, the terminal comprising:
- means for obtaining information representative of the geographical location of the terminal;
- means for searching in a database of the terminal for at least one identifier of a wireless communications interface of the terminal that is associated with said information; and
- means for automatically activating, if such an associated identifier is found, the wireless communications interface corresponding to said at least one identifier.

The invention starts from the observation that a user often activates the wireless communications interfaces of a terminal in the same locations (i.e. a WLAN interface at home or at work, or indeed in a frequently-visited station or airport, etc.). The invention advantageously proposes storing in a database of the terminal the correspondences between geographical locations occupied by the terminal and one or more wireless communications interfaces to be activated.

The invention thus makes it possible to activate the appropriate interfaces automatically as a function of the geographical location of the terminal. This relieves the user of any need to manually activate these interfaces via a dedicated menu. These interfaces are thus activated in a manner that is transparent for the user of the terminal.

The invention makes it possible not only to minimize manual procedures for activating wireless communications interfaces of a terminal, but it also provides significant savings in terms of battery life, since there is no longer any point in keeping the communications interfaces permanently activated.

In a first variant implementation of the invention, the obtaining step comprises receiving a message transmitted by a GPS system and containing information representative of the geographical location of the terminal.

By way of example, this information is constituted by the geographical coordinates of the terminal.

In a second variant implementation of the invention, the obtaining step comprises receiving a signaling message transmitted by a cellular telecommunications network to which the terminal is connected (e.g. a global system for mobile communications (GSM) network or a universal mobile telecommunications system (UMTS) network), the message containing information representative of the geographical location of the terminal.

In this second variant, the information may for example be an identifier of a cell in the cellular communications network (i.e. the cell in which the terminal is located or to which it is attached).

Thus, the invention makes it possible to rely on data that is conventionally received by the terminal from the cellular telecommunications network. It does not require any special messages to be organized between the terminal and the cellular network, but makes use of information that is ordinarily available to the terminal when connected to the cellular network, i.e. the identifier of the cell to which the terminal is attached or in which it is located.

The information representative of the geographical location of the terminal may also be constituted by the geographical coordinates of the terminal, as transmitted in a message coming from the cellular network.

In a particular implementation, the management method of the invention further comprises:
- a detection step of detecting a change in the geographical location of the terminal; and
- an automatic deactivation step of deactivating one or more previously activated interfaces.

The invention thus makes it possible to deactivate the wireless communications interfaces of the terminal automatically as a function of the geographical location of the terminal, and more particularly when its location has changed. This preserves the battery life of the terminal.

In order to avoid inappropriate deactivation of the interface, the automatic deactivation step may be implemented only on expiry of a predetermined duration, during which it is ensured that the communications interface is no longer in use by the terminal.

The invention also provides a database of a terminal having at least one wireless communications interface, the database containing at least information representative of a geographical location of the terminal associated with at least one identifier of one of said wireless communications interfaces.

In a particular implementation, the various steps of the management method are determined by computer program instructions.

Consequently, the invention also provides a computer program on a data medium, the program being suitable for being implemented in a terminal or more generally in a computer, the program including instructions adapted to implementing steps of a management method as described above.

The program may use any programming language, and it may be in the form of source code, object code, or code intermediate between source code and object code, such as in a partially compiled form, or in any other desirable form.

The invention also provides a computer-readable data medium that includes instructions of a computer program as mentioned above.

The data medium may be any entity or device capable of storing the program. For example, the medium may comprise storage means such as a read only memory (ROM), e.g. a compact disk (CD)-ROM or a microelectronic circuit ROM, or indeed magnetic recording means, e.g. a floppy disk or a hard disk.

Furthermore, the data medium may be a transmissible medium such as an electrical or optical signal, suitable for being conveyed via an electrical or optical cable, by radio, or by other means. The program of the invention may in particular be downloaded from an Internet type network.

Alternatively, the data medium may be an integrated circuit in which the program is incorporated, the circuit being adapted to execute or to be used in the execution of the method in question.

In other implementations or embodiments, it is also possible to envisage the management method and the terminal of the invention presenting all or some of the above-mentioned characteristics in combination.

BRIEF DESCRIPTION OF THE DRAWINGS

Other characteristics and advantages of the present invention appear from the following description made with reference to the accompanying drawings that show an embodiment having no limiting character. In the figures.

DETAILED DESCRIPTION OF AN EMBODIMENT

Figures 1, 3:
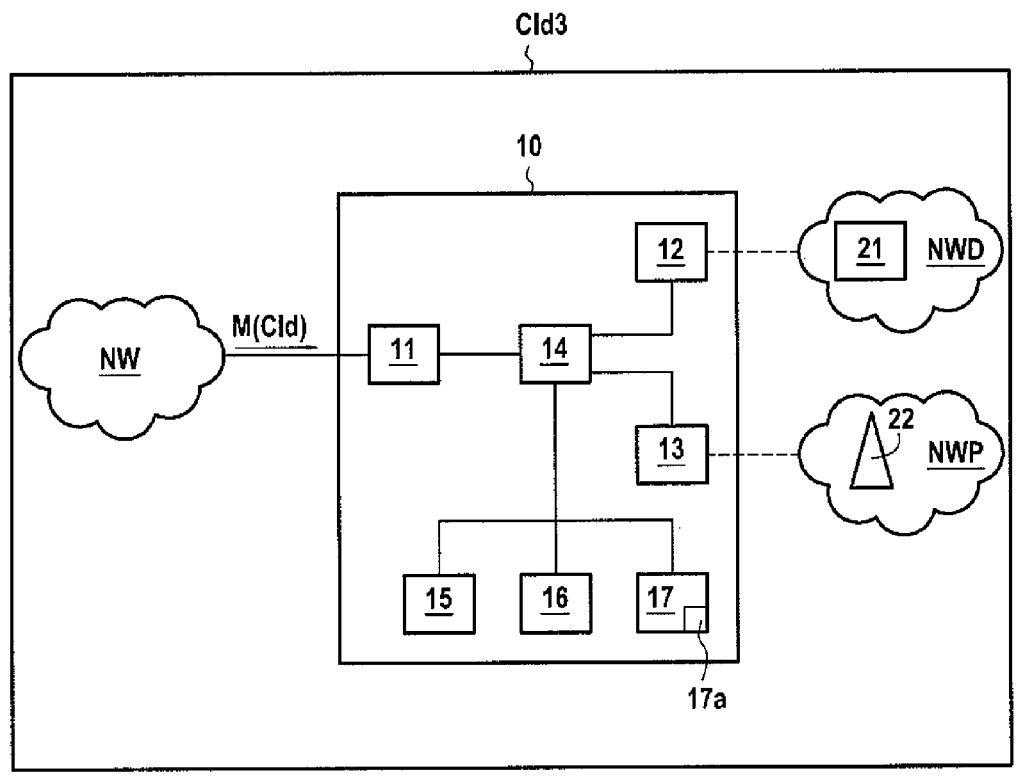
FIG. 1 shows a particular embodiment of a terminal in accordance with the invention, in its environment.
FIG. 3 shows an example of a particular implementation of a database in accordance with the invention.

FIG. 1 shows a particular embodiment of a terminal 10 in accordance with the invention, in its environment.

In the example described here, the terminal 10 is a multi-mode mobile telephone. Nevertheless, this assumption is not limiting, it being possible to apply the invention to other types of terminal, such as for example: a laptop computer, a personal digital assistant (PDA), etc.

The terminal 10 has communications means 11 enabling it to connect to a cellular telecommunications network NW. These communications means 11 comprise in particular a subscriber identity module (SIM) card and a radio interface compatible with the cellular network NW.

The term "cellular" network is used herein to mean a wireless communications network in which terminals communicate between one another by using dedicated infrastructure involving base stations installed over the territory covered by the network, each base station covering a predetermined geographical zone referred to as a cell.

In this example the cellular network NW is a telecommunications network of the universal mobile telecommunications system (UMTS) type. Nevertheless, the invention also applies to other cellular networks, such as for example, second-generation networks: global system for mobile communications (GSM); general packet radio service (GPRS); enhanced data rates for GSM evolution (EDGE); etc.; to other third-generation networks such as: high speed data packet access (HSDPA); code division multiple access (CDMA), etc.; and to fourth-generation networks of the long-term evolution (LTE) type, etc.

The terminal 10 is also provided with a short-range wireless communications interface 12 of the Bluetooth™ type and a medium-range wireless communications interface 13 of the WLAN type.

The interface 12 enables the terminal 10 to set up a wireless connection with equipment 21 in a home network NWD, itself having a Bluetooth™ interface. By way of example, the equipment 21 may be a hands-free kit, another terminal, etc. Local communication may thus be set up between the terminal 10 and the equipment 21 within the home network NWD.

In similar manner, the interface 13 enables the terminal 10 to set up a wireless connection with an access point 22 to a public network NWP (e.g. the Internet), in compliance with the WLAN protocol. In a variant, the network NWP may be a private network or a home network.

In the example considered here, consideration is given to managing the wireless communications interfaces 12 and 13 of the terminal 10. Naturally, other wireless communications interfaces could be taken into consideration, and the invention is easily applicable to managing some other number of interfaces.

Nevertheless, it should be observed that the wireless communications interfaces 12 and 13 and the communications means 11 for the cellular telecommunications network NW are mutually independent. In particular, they may be activated or deactivated independently of one another.

In the example described herein, the terminal 10 has the hardware architecture of a computer. It comprises a processor 14, a random access memory (RAM) 15, a read only memory (ROM) 16, and a non-volatile memory 17.

The ROM 16 constitutes a recording medium in accordance with the invention that is readable by the processor 14 of the terminal 10 and that has recorded thereon a computer program in accordance with the invention, the program including instructions for executing steps of a method of the invention for managing the communications interfaces 12 and 13.

Figure 2:
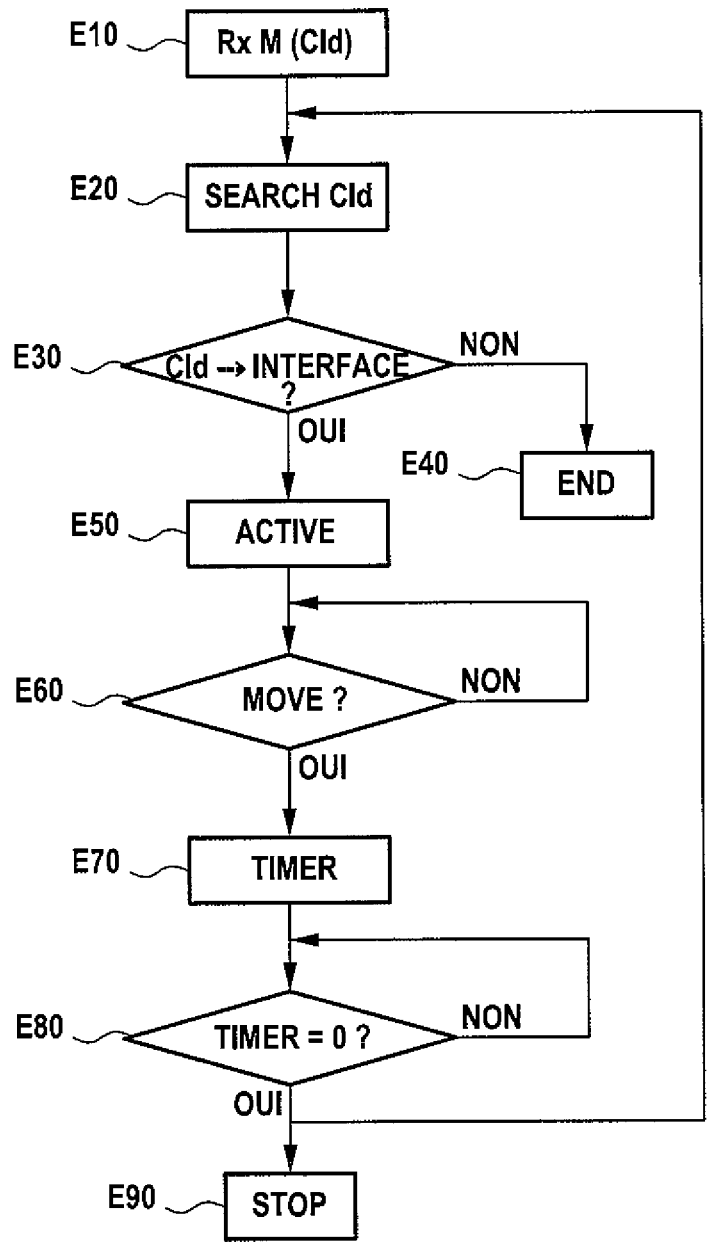
FIG. 2 is a flow chart showing the main steps of a method of managing a wireless communications interface of the terminal shown in FIG. 1, in a particular implementation of the invention.

The main steps of the method are shown for a particular implementation of the invention in FIG. 2, and described below.

It is assumed that the terminal 10 is connected to the cellular telecommunications network NW. This connection is kept active so that the terminal 10 can receive and/or send telephone calls or messages via the network NW.

In known manner, when such a connection is set up, the cellular network, in particular by using a base station (Node B), broadcasts signaling messages to the terminal 10 over the broadcast control channel (BCCH). These messages are for enabling the terminal 10 to set up a call over the network NW.

On the basis of these signaling messages, the terminal 10 can determine the particular cell in which it is located, or at least to which it is attached.

More precisely, it is assumed herein that the terminal 10 receives a message M via its communications means 11, which message M is transmitted by the base station associated with the cell in which the terminal is located over the broadcast control channel (BCCH) of the network NW (step E10).

In accordance with the UMTS standard, this message has system information blocks (SIB). The block SIB1 contains in particular an identifier CId of the cell (also written CellID).

More ample details about the system information conveyed over the BCCH are available for example in the 3GPP TS25.331 document entitled "Radio resource control: protocol specification", Release 6.

The cell identifier CId constitutes information representative of the geographical location of the terminal 10 in the meaning of the invention, since it enables the terminal to be located, even if only "coarsely". In known manner, each cell within a network is identified in unique manner, and each cell corresponds to a predefined geographical zone. Thus, a cell identifier enables the geographical location of the terminal to be identified to within the nearest cell.

The processor 14 of the terminal 10 extracts the cell identifier CId from the message M and stores it in the RAM 15.

It then searches for the identifier in a database 17A of the terminal 10 (step E20). In the meaning of the invention, a database means a data set or structure (e.g. a table).

The database 17A is stored in the non-volatile memory 17 of the terminal. It associates identifiers of cells covered by the network NW with the identifier(s) of one or more wireless communications interfaces of the terminal 10 that the user may desire to activate when located in those cells.

An example of such a database is shown in FIG. 3. In this example:
- the cell identifiers CId1 and CId2 of the network NW are associated with the identifier ID(12) of the communications interface 12;
- the cell identifier CId3 of the network NW is associated with the identifier ID(13) of the communications interface 13;
- the cell identifier CId4 of the network NW is associated with the identifiers ID(12) and ID(13) of the communications interfaces 12 and 13;
- etc.

This database may be predetermined and transmitted to the terminal, e.g. via one or another of the communications interfaces 12 or 13.

In a variant, the database may be enriched each time the user of the terminal 10 manually activates the communications interfaces 12 and 13.

For example, on each activation performed manually by the user of the terminal, the user specifies whether or not an identifier of the activated interface is to be entered into the database 17A. Thus, on receiving such a request, if the terminal 10 is in the coverage of the cellular network NW, it recovers the identifier of the cell in which it is located from one of the signaling messages transmitted by the network and it associates that identifier in the database 17A with the identifier of the activated interface.

As shown in the example of FIG. 3, a plurality of communications interfaces of the terminal may be associated with the same cell identifier. In similar manner, a communications interface may be associated with a plurality of cell identifiers.

Step E20 of searching the database 17A thus seeks to determine whether the identifier CId is in the database, and if it is, to determine which communications interface(s) of the terminal 10 is/are associated therewith (step E30). This step is implemented by interrogating the database 17A using the identifier CId, in conventional manner known to the person skilled in the art and not described in detail herein.

If the identifier CId is not in the database 17A, then the method ends (step E40). The communications interfaces 12 and 13 are not activated automatically by the processor 14, and the user remains free to activate them manually if so desired.

It is assumed here that the cell identifier CId is equal to CId3. Thus, with reference to FIG. 3, by interrogating the database 17A, the processor 14 is able to determine that the interface 13, identified by ID(13) is associated with the cell in which the terminal 10 is located.

On receiving the identifier ID(13), the processor 14 automatically activates (in other words switches on) the interface 13 (step E50), using an appropriate software application of known type that is not described in detail herein.

Activation of the interface 13 is thus triggered automatically, i.e. without requiring intervention by the user of the terminal 10.

With the interface 13 activated, a connection to the public network NWP can be made, providing the terminal 10 is close enough to the access point 22 to become paired therewith and to communicate therewith. It should be observed that the parameters for pairing with the access point 22 may also be stored in the database 17A.

In the implementation described here, after the interface 13 has been automatically activated, the processor 14 of the terminal 10 continues to analyze the cell identifiers received in the signaling messages transmitted by the cellular network NW for the purpose of detecting a change in the geographical location of the terminal 10.

More particularly, either continuously or at various predetermined instants (e.g. periodically), the processor 14 extracts each cell identifier (written CId') that it receives in those messages and compares them with the identifiers CId stored in the volatile memory 13 (step E60).

If the identifier CId' is different from the identifier CId, a change in the geographical location of the terminal 10 has been detected. In other words, the previously activated interface 13 might no longer be appropriate.

On detecting this change of geographical location, the processor 14 starts a timer for a predetermined time-out of duration $T_{time-out}$ (step E70).

If during this time-out duration $T_{time-out}$ (step E80) no message is received by the terminal 10 from the cellular network NW enabling it to determine that it is once more in the cell identified by CId, then the communications interface 13 is automatically deactivated by the processor 14 (step E90) by an appropriate software application of conventional type and not described herein.

It should be observed that steps E20 to E50 may be repeated with the new identifier CId' in order to identify another interface for activation in the database 17A, should there be one. These steps are preferably implemented before deactivating the interface 13 so as to guarantee continuity in the connection made available to the terminal 10.

In contrast, if before the expiry of the time-out duration $T_{time-out}$, the terminal 10 receives a signaling message from the cellular network NW informing it that the cell in which it is located is once more the cell identified by CId, then the communications interface 13 is kept activated, and the timer is switched off.

In another implementation of the invention, instead of verifying whether the terminal 10 is once again in the cell identified by CId, the processor 14 acts during the time-out duration to analyze whether a connection with the network NWP is active. It then automatically deactivates the interface 13 if the connection with the network NWP remains inactive throughout the time-out duration.

In another implementation of the invention, the steps E60 to E90 are not implemented and the user deactivates the interface 13 manually when so desired.

In the example described above, the information representative of the geographical location of the terminal 10 for use by the method of the invention is an identifier of the cell of the network NW in which or close to which the terminal is located, or to which it is attached. This assumption is not limiting, the invention may be applied equally well to other information representative of the geographical location of the terminal 10, such as, for example geographical coordinates representing the position of the terminal 10.

Such geographical coordinates may be obtained in particular from a message sent by the cellular network to which the terminal 10 is connected, or from a message received from a global positioning system (GPS) if the terminal has a GPS receiver. Thus, the invention is also applicable when the terminal 10 is not connected to a cellular network.

The invention claimed is:

1. A management method for managing at least one wireless communications interface of a terminal implemented by the terminal, the method comprising:
    obtaining information representative of a geographical location of the terminal;
    searching in a database of the terminal for at least one identifier of a wireless communications interface of the terminal that is associated with said information; and
    when said at least one identifier is found, automatically activating the wireless communications interface corresponding to said at least one identifier.

2. The management method according to claim 1, wherein obtaining said information comprises receiving a message transmitted by a GPS system, said message containing said information representative of said geographical location of the terminal.

3. The management method according to claim 2, wherein said information representative of said geographical location of the terminal is constituted by the geographical coordinates of the terminal.

4. The management method according to claim 1, wherein obtaining said information comprises receiving a signaling message transmitted by a cellular telecommunications network to which the terminal is connected, said signaling message containing said information representative of said geographical location of the terminal.

5. The management method according to claim 4, wherein said information representative of said geographical location of the terminal includes an identifier of a cell in the cellular telecommunications network.

6. The management method according to claim 1, further comprising:
    detecting a change in said geographical location of the terminal; and
    automatically deactivating said at least one interface.

7. A non-transitory computer-readable recording medium having recorded thereon a computer program including instructions for executing steps of the management method according to claim 1.

8. A terminal fitted with at least one wireless communications interface implemented by the terminal, the terminal comprising:
    means for obtaining information representative of a geographical location of the terminal;
    means for searching in a database of the terminal for at least one identifier of a wireless communications interface of the terminal that is associated with said information; and
    means for automatically activating, when said at least one identifier is found, the wireless communications interface corresponding to said at least one identifier.

9. A database of a terminal having at least one wireless communications interface implemented by the terminal, the database containing at least information representative of a geographical location of the terminal associated with at least one identifier of one of said at least one wireless communications interface to be automatically activated on the terminal.

* * * * *